(12) United States Patent
Hirai

(10) Patent No.: US 8,639,107 B2
(45) Date of Patent: Jan. 28, 2014

(54) INTERCHANGEABLE LENS AND CAMERA LENS SYSTEM

(75) Inventor: Daisuke Hirai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 13/048,270

(22) Filed: Mar. 15, 2011

(65) Prior Publication Data

US 2011/0229117 A1    Sep. 22, 2011

(30) Foreign Application Priority Data

Mar. 17, 2010    (JP) .................................. 2010-061055

(51) Int. Cl.
| | | |
|---|---|---|
| G03B 7/085 | (2006.01) | |
| G03B 7/095 | (2006.01) | |
| G03B 17/00 | (2006.01) | |
| G02B 9/08 | (2006.01) | |

(52) U.S. Cl.
USPC ............ 396/257; 396/529; 359/739; 359/827

(58) Field of Classification Search
USPC .................. 396/257, 238, 529–533; 359/819, 359/827–830, 738, 739
See application file for complete search history.

(56) References Cited

U.S. PATENT DOCUMENTS 5,867,737 A    2/1999    Shiokama

FOREIGN PATENT DOCUMENTS

| JP | 06-186626 A | 7/1994 |
|---|---|---|
| JP | 10-170978 A | 6/1998 |
| JP | 2009-53599 A | 3/2009 |

*Primary Examiner* — Rochelle-Ann J Blackman
(74) *Attorney, Agent, or Firm* — Canon USA Inc. IP Division

(57) ABSTRACT

An interchangeable lens includes a diaphragm, a driving unit for driving thereof, an operation member for setting an aperture value thereof, a switching unit for switching the operation member between permission and inhibition, and a control unit for operating, when the interchangeable lens is mounted on a camera main body including no recognition unit to recognize information on the aperture value set by the operation member, the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and giving a response to the camera main body in a form of operating the driving unit according to the diaphragm driving command.

7 Claims, 5 Drawing Sheets

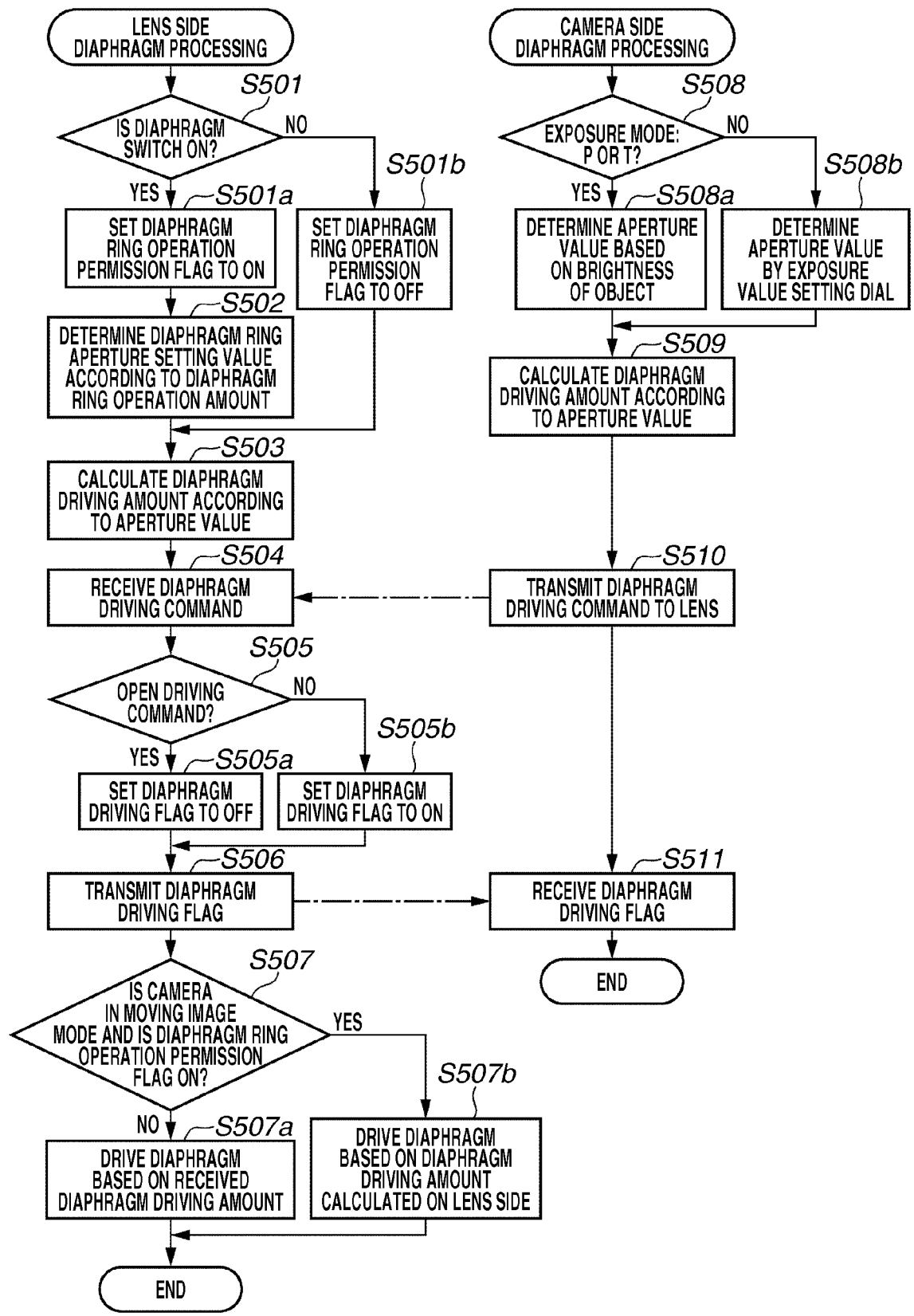

INTERCHANGEABLE LENS AND CAMERA LENS SYSTEM

BACKGROUND OF THE INVENTION

1. Field of the Invention

The present invention relates to an interchangeable lens including a diaphragm operation member, and a camera lens system including the interchangeable lens.

2. Description of the Related Art

Conventionally, as a diaphragm control system of a lens attached to a lens interchangeable camera, for example, there is a system in which a camera side transmits a desired diaphragm driving amount to the lens by a communication unit, and the lens drives a diaphragm by the received driving amount to control a light amount. To improve operability during moving image capturing, there is a system which includes an electronically-controllable diaphragm operation member on a lens side, and enables the lens side to instruct a diaphragm driving amount.

Japanese Patent Application Laid-Open No. 06-186626 discusses a configuration in which a diaphragm operation member of a lens side can control a diaphragm when a diaphragm operation switch of the lens side is in an operation permitted state.

Japanese Patent Application Laid-Open No. 2009-53599 discusses a system in which a camera determines whether a lens includes a diaphragm operation member and, when the lens includes the diaphragm operation member, allows selection as to which of diaphragm operation members of a camera side and a lens side is preferentially used.

However, in the technique discussed above, a case where the camera includes no unit to determine whether the lens side has a diaphragm operation member is not referred to. In the technique discussed in Japanese Patent Application Laid-Open No. 2009-53599, the camera uses exclusive communication function to determine whether the lens side includes a diaphragm operation member.

However, depending on a difference in release time of cameras, the camera may not include such exclusive communication function. When a lens equipped with a diaphragm operation member is loaded on the camera having no exclusive communication function, the camera side cannot determine whether the lens includes the diaphragm operation member.

In this case, when the diaphragm operation member of the lens side is operated while an operation of the diaphragm operation member is permitted, the camera side receives information on a diaphragm operation from the lens side irrespective of no command issued to operate a diaphragm. The camera side may then determine that the lens side is performing an operation different from that by a command of the camera side, and stop the system.

SUMMARY OF THE INVENTION

According to an aspect of the present invention, an interchangeable lens includes a diaphragm, a driving unit configured to drive the diaphragm, an operation member configured to set an aperture value of the diaphragm, a switching unit configured to switch an operation of the operation member between permission and inhibition, and a control unit configured to operate, while the interchangeable lens is loaded on a camera main body which includes no unit to recognize information on the aperture value set by the operation member, the driving unit according to a diaphragm driving command from the camera main body when the switching unit is in a state of inhibiting the operation of the operation member, operate the driving unit according to the aperture value set by the operation member when the switching unit is in a state of permitting the operation of the operation member, and give a response to the camera main body in a form of operating the driving unit according to the diaphragm driving command.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating an operation when the lens is attached to a camera main body which has no exclusive communication function according to the exemplary embodiment of the present invention.

DESCRIPTION OF THE EMBODIMENTS

Various exemplary embodiments, features, and aspects of the invention will be described in detail below with reference to the drawings.

Figure 2:
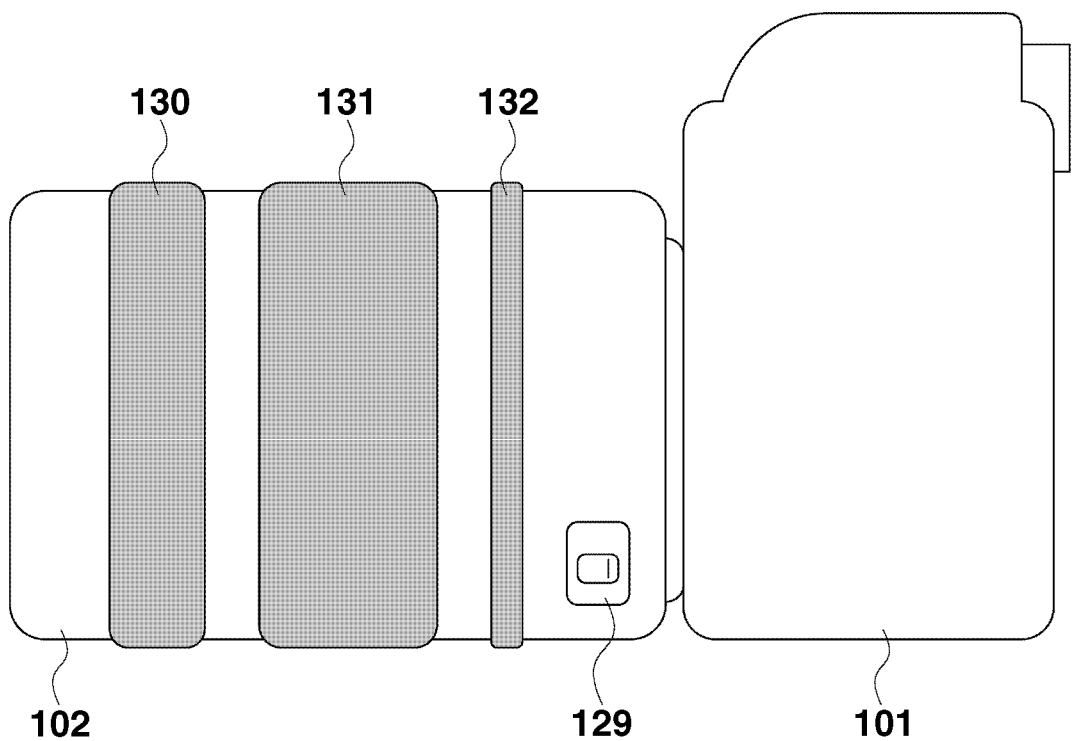
FIG. 2 illustrates the entire camera lens system according to the exemplary embodiment of the present invention.

FIG. 2 illustrates an entire camera lens system according to an exemplary embodiment of the present invention. The camera lens system includes a camera main body 101 and a lens 102 removable from the camera main body 101. The lens 102 includes a focus ring 130 for focusing, a zoom ring 131 for zooming, a diaphragm ring 132 (operation member) for operating a diaphragm, and a diaphragm switch 129 (switching unit) for selecting permission/inhibition of an operation of the diaphragm ring 132.

Figure 3:
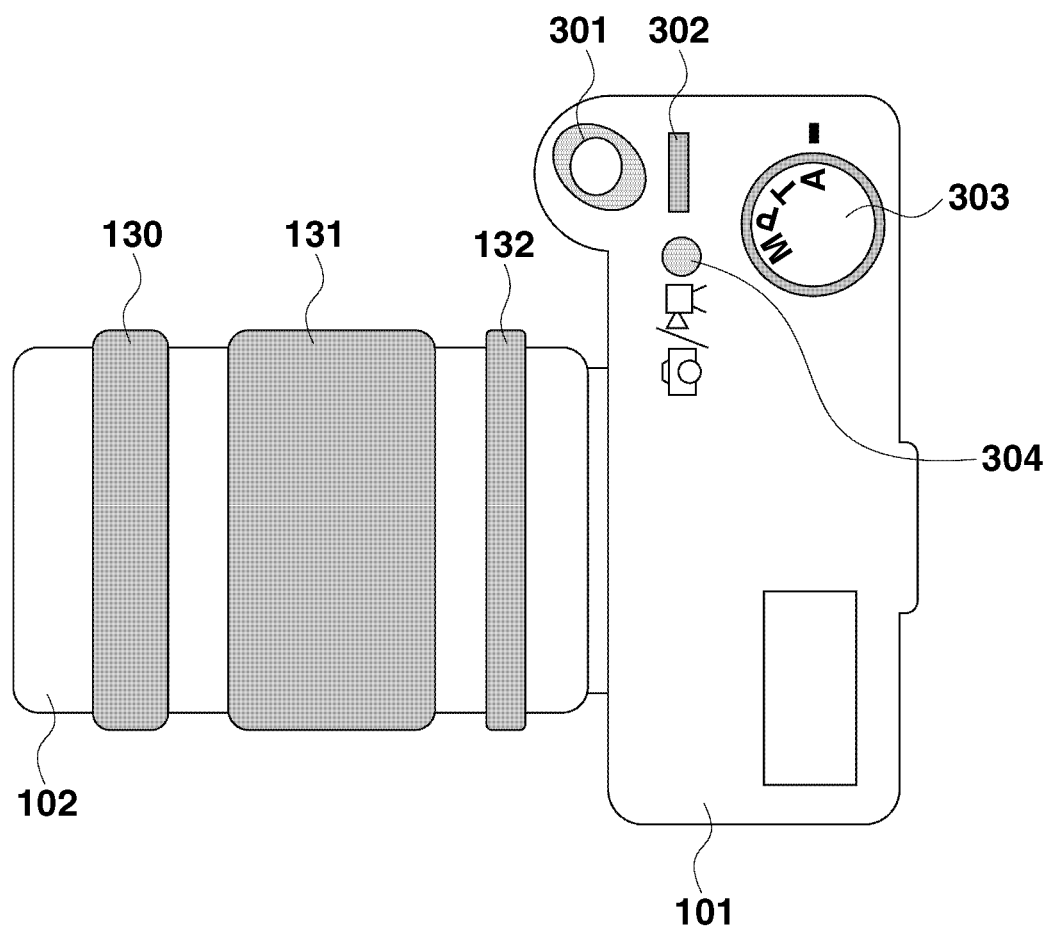
FIG. 3 is a top view illustrating the camera lens system according to the exemplary embodiment of the present invention.

FIG. 3 is a top view of the camera lens system illustrated in FIG. 2. On the top surface of the camera main body 101, there are a release button 301, an exposure value setting dial 302 for changing an exposure value, an exposure mode setting dial 303 for changing an exposure mode of the camera, and a switching button 304 for switching a mode of the camera between a moving image mode and a still image mode.

Concerning the exposure mode of the camera, there are a manual mode (M) in which a user determines an aperture value and a shutter speed, and a program mode (P) in which the camera automatically determines an aperture value and a shutter speed. There are also a shutter speed priority mode (T) in which the user determines a shutter speed and the camera determines an aperture value, and a diaphragm priority mode (A) in which the user determines an aperture value and the camera determines a shutter speed to achieve appropriate exposure.

These modes can be selected by rotating the exposure mode setting dial 303. Rotating the exposure value setting dial 302 enables changing of an exposure value such as an aperture value or a shutter speed.

Figure 1:
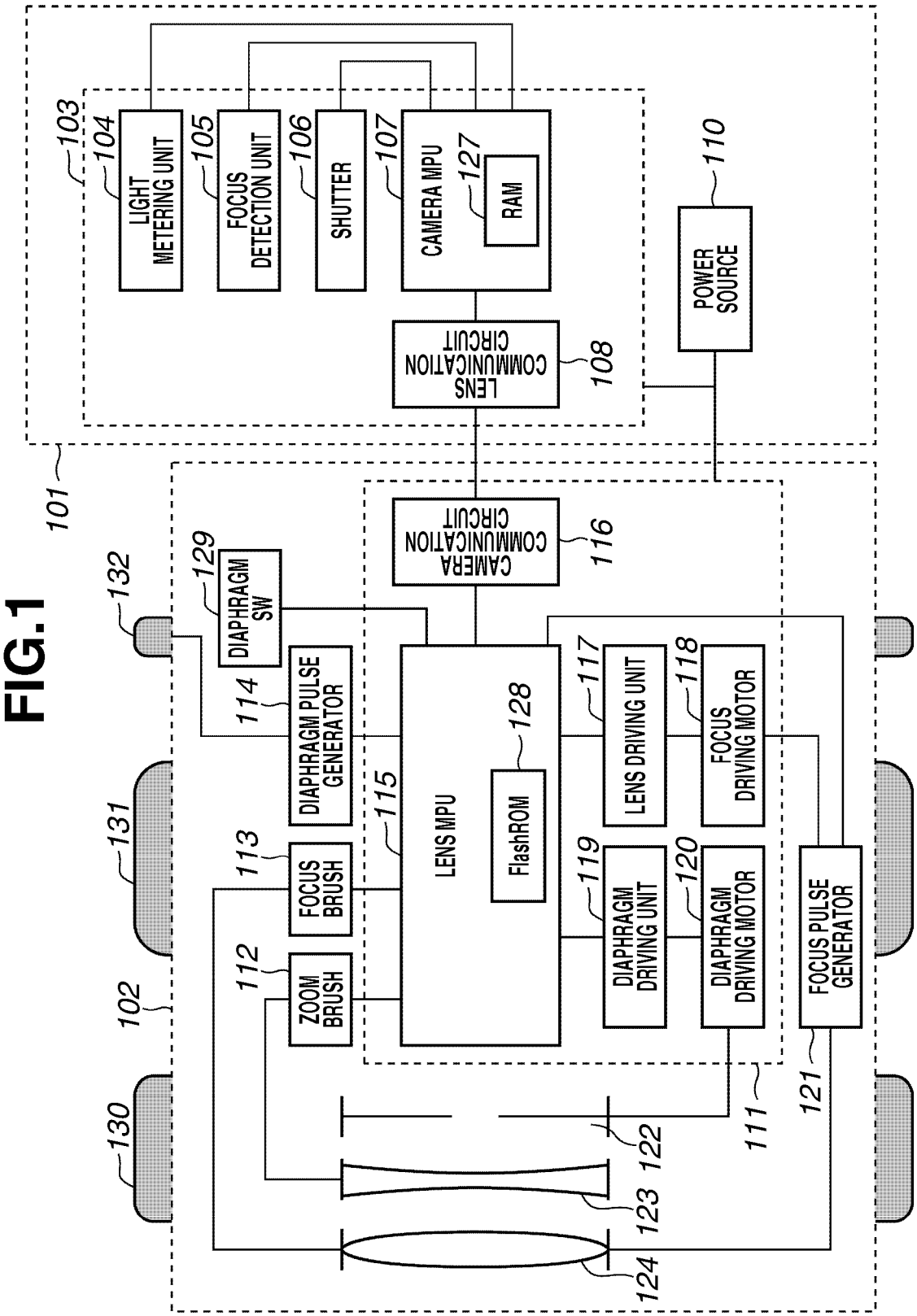
FIG. 1 is a block diagram illustrating a camera lens system according to an exemplary embodiment of the present invention.

FIG. 1 is a block diagram of the camera lens system illustrated in FIG. 2. The camera main body 101 includes an electric circuit 103. The electric circuit 103 includes a light metering unit 104 for measuring an amount of light transmitted through a photographing optical system of the lens 102, and a focus detection unit 105 for detecting (detecting focus) a focus adjustment state of the photographing optical system. The electric circuit 103 further includes a shutter 106 for controlling exposure time of an image sensor (not illustrated).

The camera main body 101 includes a camera micro processing unit (MPU) 107 for performing various control operations of the camera main body 101. The camera MPU 107 includes a random access memory (RAM) 127, which is a volatile memory for storing data. The camera main body 101 further includes a power source 110, which supplies power to the lens 102.

The lens 102 includes a diaphragm 122, a zooming lens 123, and a focusing lens 124. A zoom brush 112 slides, to detect a position of the zooming lens 123, on a resistor (not illustrated) according to the movement of the zooming lens 123, and outputs a signal of a voltage value corresponding to the position of the zooming lens 123.

A focus brush 113 slides, to detect a position of the focusing lens 124, on the resistor (not illustrated) according to the movement of the focusing lens 124, and outputs a signal of a voltage value corresponding to the position of the focusing lens 124. A diaphragm pulse generator 114 generates a pulse signal according to a rotation operation of the diaphragm ring 132.

An electric circuit 111 in the lens includes a camera communication circuit 116 for performing serial communication with the camera main body 101, and a lens MPU 115 (control unit) for performing various control operations of the lens 102. The electric circuit 111 includes a lens driving unit 117 for controlling, according to a control signal from the lens MPU 115, driving of a focus driving motor 118 for driving the focusing lens 124.

The electric circuit 111 further includes a diaphragm driving unit 119 for controlling, according to the control signal from the lens MPU 115, driving of a diaphragm driving motor 120 (driving unit) for driving the diaphragm 122. For example, a two-phase pulse motor is used for the diaphragm driving motor 120.

The lens 102 includes a focus pulse generator 121 for outputting a pulse signal according to the movement of the focusing lens 124. The lens MPU 115 includes an electrically-rewritable Flash read-only memory (ROM) 128 for storing firmware, which is a control program necessary for operating the lens 102.

Figure 4:
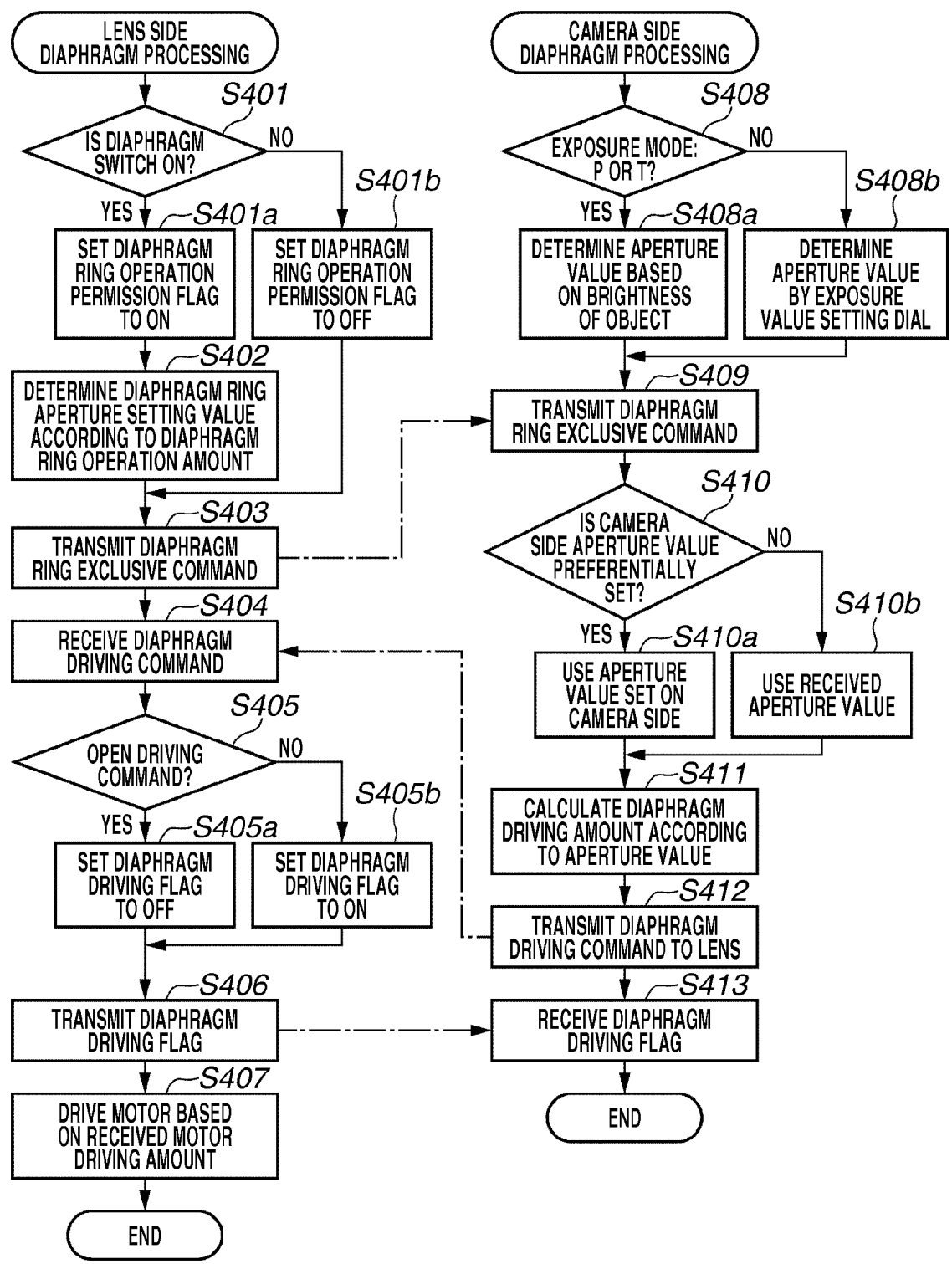
FIG. 4 is a flowchart illustrating an operation when a lens is attached to a camera which has exclusive communication function according to the exemplary embodiment of the present invention.

Next, referring to flowcharts in FIGS. 4 and 5, a detailed operation is described.

A diaphragm ring exclusive command is a command which the lens 102 having a diaphragm ring can transmit. The lens 102 refers to an ID of the camera main body 101 to determine whether the diaphragm ring exclusive command is receivable. The diaphragm ring exclusive command is 1-byte communication data, and an upper 1 bit is a diaphragm ring operation permission flag indicating a diaphragm ring operation state, and lower 7 bits represent an aperture value determined based on an operation amount of the diaphragm ring.

First, referring to a flowchart in FIG. 4, operations of the lens 102 side and the camera main body 101 side when the cameral main body 101 can receive the diaphragm ring exclusive command, are described.

(Lens Side Operation)

When the diaphragm switch 129 is set to permit an operation of the diaphragm ring 132 (YES in step S401), in step S401a, the diaphragm ring operation permission flag is set to ON, and the processing proceeds to step S402. When the diaphragm switch 129 is set to inhibit the operation (NO in step S401), in step S401b, the diaphragm ring operation permission flag is set to OFF, and the processing proceeds to step S403.

In step S402, the pulse generator 114 generates pulses according to an operation amount of the diaphragm ring 132. The lens MPU 115 detects the operation amount of the diaphragm ring 132 by counting the number of generated pulses, and determines a diaphragm setting value according to the detected operation amount.

In step S403, the diaphragm ring exclusive command containing the diaphragm setting value determined in step S402 is transmitted through the camera communication circuit 116 and a lens communication circuit 108 to the camera MPU 107. In step S404, a diaphragm driving command is received from the camera MPU 107 as needed. The diaphragm driving command contains a diaphragm driving direction and a diaphragm driving amount.

When the received diaphragm driving command is a open driving command for returning the diaphragm to a open position (YES in step s405), in step S405a, the lens MPU 115 sets a flag indicating that the diaphragm is being driven, to OFF. When the received diaphragm driving command is not an open driving command (NO in step S405), in step S405b, the lens MPU 115 sets the flag indicating that the diaphragm is being driven, to ON.

In step S406, the lens MPU 115 transmits the diaphragm driving flag indicating a diaphragm driving state to the camera MPU 107. The camera MPU 107 refers to the flag to monitor an operation of the diaphragm of the lens side. For example, when the diaphragm driving flag is not set to ON within a predetermined period after the camera MPU 107 has issued a driving command to narrow down the diaphragm, generation of an error is determined to stop the processing.

In step S407, the lens MPU 115 transmits a command to drive the diaphragm by the diaphragm driving amount received in step S404 to the diaphragm driving unit 119. The diaphragm driving unit 119 drives the diaphragm driving motor 120 to drive the diaphragm 122.

(Cameras Side Operation)

In step S408, the camera main body 101 changes a diaphragm control method based on an exposure mode set by the exposure mode setting dial 303. When the exposure mode is the program mode (P) or the shutter speed priority mode (T) (YES in step S408), in step S408a, an aperture value is determined to achieve appropriate exposure according to brightness of an object. When the exposure mode is the manual mode (M) or the diaphragm priority mode (A) (NO in step S408), in step S408b, an aperture value is determined according to an operation amount of the exposure value setting dial 302.

In step S409, the diaphragm ring exclusive command is received as needed, and an aperture value determined by the diaphragm ring 132 is acquired.

In step S410, which of the camera side and the lens side performs a diaphragm operation is determined based on the setting on the camera side. When the diaphragm ring operation permission flag received in step S409 is OFF, the diaphragm is set on the camera side. When the diaphragm ring operation permission flag is ON, which of the camera and the lens takes priority is switched based on the setting on the camera side.

When the camera side preferentially sets an aperture value (YES in step S410), in step S410a, the aperture value determined by the exposure value setting dial 302 is used. When the lens side preferentially sets an aperture value (NO in step S410), in step S410b, the received aperture value is used. In step S411, a diaphragm driving amount to be transmitted to the lens is calculated from the aperture value determined in step S410.

In step S412, a diaphragm driving command is transmitted to the lens MPU 115. In step S413, the diaphragm driving flag is received from the lens.

As described above, when the camera lens system is attached to the camera which can receive the diaphragm ring exclusive command, information is exchanged between the camera and the lens, and on the lens side and the camera side, the diaphragm can respectively be operated.

Next, referring to a flowchart in FIG. 5, operations of the lens 102 side and the camera main body 101 side, when the camera main body 101 cannot recognize the diaphragm ring exclusive command, are described. Such a combination may occur when the camera main body 101 is released before the lens 102 equipped with the diaphragm ring.

There are several methods for detecting whether the camera main body 101 can recognize the diaphragm ring exclusive command. An example is that if there is stored information on whether the diaphragm ring exclusive command can be recognized in the memory of the camera main body, receiving the information by the lens enables detection as to whether the diaphragm ring exclusive command of the camera main body can be recognized.

Another example is that information on whether the diaphragm ring exclusive command can be recognized is stored beforehand for each camera main body in the memory of the lens, and whether the attached camera main body can recognize the diaphragm ring exclusive command, can be detected based on the information.

(Lens Side Operation)

When the diaphragm switch 129 is set to permit an operation of the diaphragm ring 132 (YES in step S501), in step S501a, the diaphragm ring operation permission flag is set to ON, and the processing proceeds to step S502. When the diaphragm switch 129 is set to inhibit the operation (NO in step S501), in step S501b, the diaphragm ring operation permission flag is set to OFF, and the processing proceeds to step S504.

In step S502, the pulse generator 114 generates pulses according to an operation amount of the diaphragm ring 132. The lens MPU 115 detects the operation amount of the diaphragm ring 132 by counting the number of generated pulses, and determines a diaphragm setting value according to the detected operation amount.

In step S503, a diaphragm driving amount is calculated from the diaphragm setting value determined in step S502. In step S504, a diaphragm driving command is received from the camera MPU 107 as needed. The diaphragm driving command contains a diaphragm driving direction and a diaphragm driving amount.

When the received diaphragm driving command is a open driving command for returning the diaphragm to an open position (YES in step s505), in step S505a, the lens MPU 115 sets a flag indicating that the diaphragm is being driven, to OFF. When the received diaphragm driving command is not an open driving command (NO in step S505), in step S505b, the lens MPU 115 sets the flag indicating that the diaphragm is being driven, to ON.

In step S506, the lens MPU 115 transmits the diaphragm driving flag indicating the diaphragm driving state to the camera MPU 107. The camera MPU 107 refers to the flag to monitor the operation of the diaphragm of the lens side. For example, when the diaphragm driving flag is not set to ON within a predetermined period after the camera MPU 107 has issued a driving command to narrow down the diaphragm, generation of an error is determined to stop the processing.

In step S507, whether the camera main body 101 is in a moving image capturing mode is determined. When the camera main body 101 is in the moving image capturing mode, and permitted to operate the diaphragm ring (YES in step S507), in step S507b, the diaphragm is driven by the driving amount calculated in step S503. When the camera main body 101 is in the moving image capturing mode but inhibited to operate the diaphragm ring, or in a still image capturing mode (NO in step S507), in step S507a, the diaphragm is driven by the driving amount received in step S504.

(Cameras Side Operation)

In step S508, the camera main body 101 changes a diaphragm control method based on an exposure mode set by the exposure mode setting dial 303. When the exposure mode is the program mode (P) or the shutter speed priority mode (T) (YES in step S508), in step S508a, an aperture value is determined to achieve appropriate exposure according to brightness of an object. When the exposure mode is the manual mode (M) or the diaphragm priority mode (A) (NO in step S508), in step S508b, an aperture value is determined according to an operation amount of the exposure value setting dial 302.

In step S509, a diaphragm driving amount is calculated based on the aperture value determined in step S508. In step S510, a diaphragm driving command is transmitted to the lens MPU 115. In step S511, a diaphragm driving flag is received from the lens.

This configuration enables the lens of the present invention, even when attached to a camera which cannot recognize the diaphragm ring exclusive communication, to perform a diaphragm operation by using the diaphragm ring. In the moving image capturing mode, diaphragm effects can be checked by monitoring an actually captured image displayed on a display disposed backside of the camera.

Normally, when the diaphragm does not operate according to a camera driving command, error processing is performed. However, in step S505, by setting the diaphragm driving flag to ON or OFF according to the driving command of the camera side, the lens side transmits a response to the camera side in the form of operating the diaphragm according to the driving command of the camera side. Thus, the camera side determines that the diaphragm operation is normally performed on the lens side.

During still image capturing, even when the user operates the diaphragm by using the diaphragm ring, generally, the user cannot check a set aperture value. Thus, unintended switching of the aperture value is prevented by invalidating a diaphragm setting operation by the diaphragm ring irrespective of a state of the diaphragm switch.

The diaphragm ring is disposed in consideration of diaphragm operability during moving image capturing. During the moving image capturing, it is convenient if the diaphragm can be operated by using the diaphragm ring. Thus, a configuration can be employed where the lens side detects a state of the camera, a ring operation is then permitted irrespective of a state of the diaphragm switch in the moving image capturing mode, while the ring operation is inhibited irrespective of the state of the diaphragm switch in the still image mode.

In this case, in the flowchart of FIG. 5, steps S507, S507a, and S507b are replaced by steps S501, S501a, and S501b. In step S501, whether the camera side is in the moving image capturing mode is determined. In the case of the moving image capturing mode (YES in step S501), in step S501a, the diaphragm ring operation permission flag is set to ON, and the processing proceeds to step S502. In the case of the still image capturing mode (NO in step S501), in step S501b, the diaphragm ring operation permission flag is set to OFF, and the processing proceeds to step S504.

The camera main body to which the interchangeable lens of the present invention is attached can be a still camera or a video camera as long as the camera main body has no diaphragm exclusive communication function.

The exemplary embodiment of the present invention has been described. However, the present invention is not limited to the exemplary embodiment. Various changes and modifications can be made within a gist of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-061055 filed Mar. 17, 2010, which is hereby incorporated by reference herein in its entirety.

What is claimed is:

1. An interchangeable lens comprising:
a diaphragm;
a driving unit configured to drive the diaphragm;
an operation member configured to set an aperture value of the diaphragm;
a switching unit configured to switch an operation of the operation member between permission and inhibition; and
a control unit configured to operate, when the interchangeable lens is mounted on a camera main body which includes no recognition unit to recognize information on the aperture value set by the operation member, the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command.

2. The interchangeable lens according to claim 1, further comprising a detection unit configured to detect that the camera main body includes no recognition unit to recognize the information on the aperture value set by the operation member.

3. An interchangeable lens comprising:
a diaphragm;
a driving unit configured to drive the diaphragm;
an operation member configured to set an aperture value of the diaphragm;
a switching unit configured to switch an operation of the operation member between permission and inhibition; and
a control unit configured to operate the driving unit,
wherein, when the interchangeable lens is mounted on a camera main body which includes no recognition unit to recognize information on the aperture value set by the operation member and the camera main body is in a state of capturing a moving image, the control unit is configured to operate the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command, and
wherein, when the interchangeable lens is mounted on the camera main body which includes no recognition unit to recognize information on the aperture value set by the operation member and the camera main body is in a state of capturing a still image, irrespective of a state of the switching unit, the control unit is configured to operate the driving unit according to the diaphragm driving command from the camera main body.

4. An interchangeable lens comprising:
a diaphragm;
a driving unit configured to drive the diaphragm;
an operation member configured to set an aperture value of the diaphragm;
a switching unit configured to switch an operation of the operation member between permission and inhibition, and
a control unit configured to operate the driving unit,
wherein, when the interchangeable lens is mounted on a camera main body which includes no recognition unit to recognize information on the aperture value set by the operation member and the camera main body is in a state of capturing a still image, the control unit is configured to operate the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command, and
wherein, when the interchangeable lens is mounted on a camera main body which includes no recognition unit to recognize information on the aperture value set by the operation member and the camera main body is in a state of capturing a moving image, irrespective of a state of the switching unit, the control unit is configured to operate the driving unit according to the aperture value set by the operation member, and give a response to the camera main body in a form of operating the driving unit according to the diaphragm driving command.

5. A camera system comprising:
an interchangeable lens; and
a camera main body which can capture a moving image and includes no recognition unit to recognize information on an aperture value set by the operation member,
wherein the interchangeable lens comprising:
a diaphragm;
a driving unit configured to drive the diaphragm;
an operation member configured to set an aperture value of the diaphragm;

a switching unit configured to switch an operation of the operation member between permission and inhibition; and a control unit configured to operate, when the interchangeable lens is mounted on a camera main body which includes no recognition unit to recognize information on the aperture value set by the operation member, the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command.

6. A camera system comprising:
an interchangeable lens; and
a camera main body which can capture a moving image and includes no recognition unit to recognize information on an aperture value set by the operation member,
wherein the interchangeable lens comprising:
a diaphragm;
a driving unit configured to drive the diaphragm;
an operation member configured to set an aperture value of the diaphragm;
a switching unit configured to switch an operation of the operation member between permission and inhibition; and a control unit configured to operate the driving unit,
wherein, when the interchangeable lens is mounted on a camera main body which includes no recognition unit to recognize information on the aperture value set by the operation member and the camera main body is in a state of capturing a moving image, the control unit is configured to operate the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command, and wherein, when the interchangeable lens is mounted on the camera main body which includes no recognition unit to recognize information on the aperture value set by the operation member and the camera main body is in a state of capturing a still image, irrespective of a state of the switching unit, the control unit is configured to operate the driving unit according to the diaphragm driving command from the camera main body.

7. A camera system comprising:
an interchangeable lens; and
a camera main body which can capture a moving image and includes no recognition unit to recognize information on an aperture value set by the operation member,
wherein the interchangeable lens comprising:
a diaphragm;
a driving unit configured to drive the diaphragm;
an operation member configured to set an aperture value of the diaphragm;
a switching unit configured to switch an operation of the operation member between permission and inhibition; and an operation member configured to set an aperture value of the diaphragm;
a switching unit configured to switch an operation of the operation member between permission and inhibition; and a control unit configured to operate the driving unit,
wherein, when the interchangeable lens is mounted on a camera main body which includes no recognition unit to recognize information on the aperture value set by the operation member and the camera main body is in a state of capturing a still image, the control unit is configured to operate the driving unit according to a diaphragm driving command from the camera main body if the switching unit is in a state of inhibiting the operation of the operation member, and operate the driving unit according to the aperture value set by the operation member if the switching unit is in a state of permitting the operation of the operation member, and give a response to the camera main body in a form of operating the driving unit according to the diaphragm driving command, and wherein, when the interchangeable lens is mounted on a camera main body which includes no recognition unit to recognize information on the aperture value set by the operation member and the camera main body is in a state of capturing a moving image, irrespective of a state of the switching unit, the control unit is configured to operate the driving unit according to the aperture value set by the operation member, and give a response to the camera main body in a form of operating the driving unit according to the diaphragm driving command.

* * * * *